April 12, 1966 W. J. GARDNER 3,245,405
INFLATABLE THERAPEUTIC DEVICE AND METHOD OF MAKING SAME
Filed Nov. 26, 1962

INVENTOR.
WILLIAM J. GARDNER
BY

Teare, Fetzer & Teare
ATTORNEYS

United States Patent Office 3,245,405
Patented Apr. 12, 1966

3,245,405
INFLATABLE THERAPEUTIC DEVICE AND
METHOD OF MAKING SAME
William J. Gardner, 2569 Berkshire Road,
Cleveland Heights, Ohio
Filed Nov. 26, 1962, Ser. No. 239,977
11 Claims. (Cl. 128—87)

This invention relates in general to a therapeutic device and method of making the same, and more particularly relates to improveemnts in the method of making an inflatable pressure responsive device, for applying a uniform pressure upon an extremity such as an arm or a foot or the like, inserted therein. The therapeutic device embodied herein is immediately applicable for use as a dressing, splint, bandage or the like for treatment of fractures, burns, bruises or other such extensive wounds or injuries.

Heretofore, one form of pressure device has embodied an inner envelope and an outer envelope defining an open ended sleeve-like article into which an extremity may be inserted for observation and treatment. The respective envelopes are secured together at their upper and lower ends and along one side thereof forming a space therebetween to receive therein fluid pressure for inflating the device. Such envelopes have been made of plastic film, such as polyvinyl chloride, polyethylene, and due to the temperature characteristics thereof, the securement of the inner and outer envelopes has been accomplished by means of conventional fin seals. Such seals are made by merely joining the surfaces of the materials together in an abutting relation and by applying heat and/or pressure thereto to provide an integral bond.

While a device made as aforesaid provides a suitable arrangement for a limited purpose, it has been discovered that it will not in all cases withstand the required pressure at a temperature to which it must be subjected in normal usage. It has been found that where polyvinyl chloride is used, it is necessary, in order to obtain the proper degree of permeability to utilize a thickness which is objectionable. For example, a device made of polyvinyl chloride material must have a wall thickness of at least 0.009 inch, since at lesser thicknesses the material is subject to pin-holing which results in uncontrolled pressure leakage from the device. On the other hand, a material thickness, such as 0.009 inch for example, is undesirable because upon inflation, the folds of the material adjacent to the skin assume a tent-like formation. In such case, a portion of the material is held out of contact with the extremity, thereby causing blisters to form on the skin.

One of the difficulties encountered, therefore, is the unavailability of thinner materials possessing the necessary pressure and temperature characteristics and which can be economically and effectively sealed to provide a reliable hermetic device. Accordingly, while a material, such as nylon, has been found to possess the necessary requirements of stretch resistance, abrasion resistance, permeability and temperature characteristics, it has been found that it will not withstand the pressure requirements when secured together by a fin type of seal. It has been found, for example, that when the aforementioned device is comprised of nylon or the like and is subjected to a pressure of about 4 p.s.i., the conventional fin seals yield or completely rupture, thereby destroying the usefulness of the article.

Accordingly, an object of the present invention is to provide a therapeutic device of the character described which may be formed from a sheet of thin, flexible, "plastic" film-like material which may be folded and sealed in a manner to provide a satisfactory, double-walled, inflatable, sleeve-like device for receiving an extremity therein, and which will be ruptureless at normal working pressures.

Another object of the present invention is to provide a therapeutic device of the character described which is formed from at least two superimposed laminated layers, wherein each layer is comprised of a thin, flexible, "plastic" film-like material and wherein each of the laminated layers are superimposed, folded and sealed in a manner to provide a satisfactory doubled-walled, inflatable, sleeve-like device for receiving an extremity therein.

Another object of the present invention is to provide a therapeutic device of the character described which may be readily inflated through a self-sealing valve-type arrangement by oral means, or by other pressure producing means, for applying a uniform pressure to an extremity inserted therein.

A still further object of the present invention is to provide a therapeutic device of the character described and a method of making the same which is economical to produce, which is efficient and reliable in use, and which may be readily transported or carried, with minimum space requirement.

Briefly, the invention is carried out in one form by taking a sheet of flexible, transparent, "plastic," film-like material, such as nylon or the like, and folding it centrally thereof to form a tube with the opposed marginal edges of the sheet overlapped throughout the full length thereof. The overlapping marginal edges are then sealed together thereby resulting in a tube which is open at both ends. The open ended tube itself may then be centrally folded in a direction generally transverse to the first mentioned fold, such that the open ends thereof substantially overlap throughout their full length. The overlapping ends may then be sealed together thereby resulting in a double-walled, inflatable sleeve-like device which may be placed around an extremity. In the instant arrangement, by folding and overlapping the aforementioned type of "plastic" film-like material, in the manner described, there is achieved a therapeutic device which is capable of withstanding much higher pressures than that heretofore obtained by conventional sealing techniques.

The invention is illustrated in another form by utilizing a laminated sheet structure. Each sheet per se preferably includes a film of flexible, transparent "plastic-like" material, such as nylon, superimposed on a second film of flexible, transparent "plastic-like" material, such as polyethylene, which are secured together to form a composite laminated sheet. Two such sheets, which are substantially coextensive and preferably of a quadrilateral configuration, are placed together with the polyethylene films in face to face contiguous relationship. The superimposed sheets are then offset relative to one another to provide a pair of narrow strips or seaming surfaces along two opposing parallel edges, thus leaving a portion of the contiguous polyethylene films exposed along each such narrow strip. The sheets are then secured together, such as by heat sealing, along their two coextensive marginal edges and along the two remaining inset edges, thereby providing a hermetic chamber or space therebetween which is capable of being inflated. The sheets are then folded in such manner that the parallel opposed polyethylene seaming surfaces are brought together in overlapping relationship, whereupon, the overlapping seaming surfaces are heat sealed together, thereby resulting in a double-walled, inflatable, sleeve-like device or tube into which an extremity may be inserted. The device may then be inflated for the desired therapeutic purpose, as aforesaid.

Figure 1:
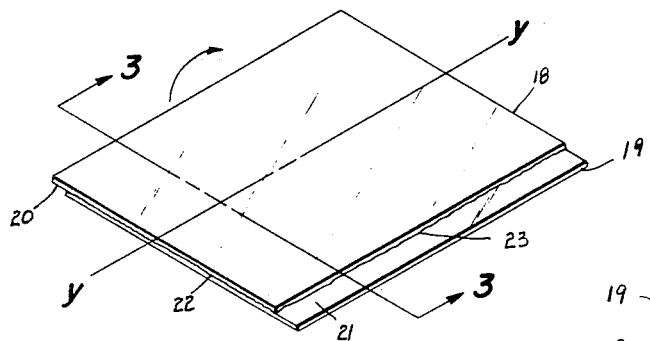
FIG. 1 is a perspective view, on a reducd scale, of a therapeutic device of the present invention showing two superimposed laminated layers of flexible, transparent, "plastic" film-like material secured together in preparation for folding along line Y—Y.
Figure 2:
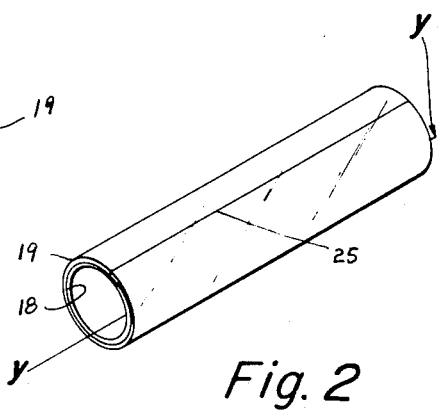
FIG. 2 is a perspective view, on a reduced scale, showing the superimposed laminated layers of FIG. 1 centrally folded along line Y—Y and secured together to provide a double-walled, inflatable sleeve-like device which embodies a modified form of the present invention.
Figure 3:
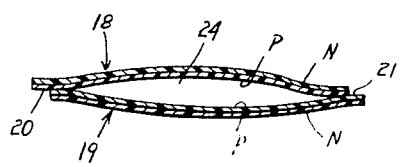
FIG. 3 is an enlarged vertical sectional view taken generally along the plane of line 3—3 of FIG. 1, looking in the direction of the arrows.
Figure 4:
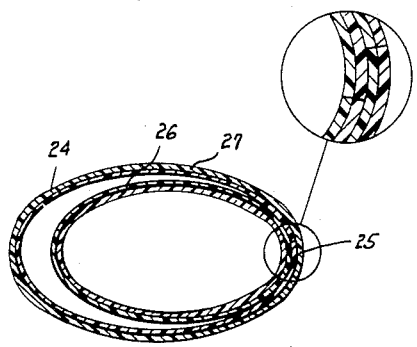
FIG. 4 is a side elevational view, on a reduced scale, showing the device of FIG. 3 in an inflated condition and with an extremity, such as an arm, inserted therein.
Figure 5:
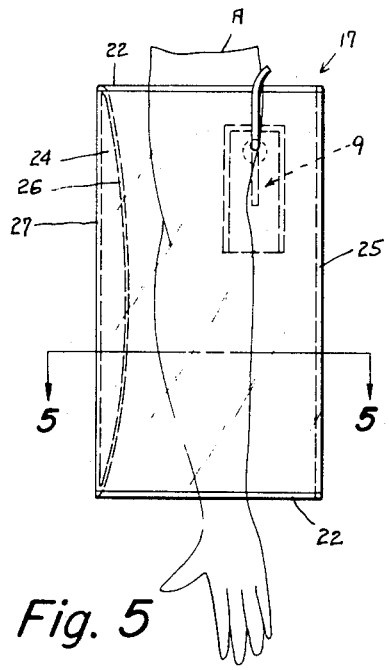
FIG. 5 is a horizontal cross-sectional view taken generally along the plane of line 5—5 of FIG. 4, looking in the direction of the arrows, and with the extremity removed therefrom.

As shown in FIGS. 1-5 of the drawings, the invention is illustrated by utilizing a laminate-like sheet construction. In the form illustrated, the therapeutic device designated generally at 17 is preferably formed of two coextensive laminated sheets 18 and 19. As shown by vertical cross-section in FIG. 3, each laminated sheet per se preferably includes an outer film N of flexible, transparent, "plastic" or like material, such as nylon, and a coextensive inner film P of a flexible, transparent "plastic" or like material, such as polyethylene, secured together, as by heat and/or pressure or by suitable adhesives as known in the art, to form a composite laminated sheet. Two such sheets 18 and 19, which are substantially coextensive and preferably of a quadrilateral configuration, are placed together with the polyethylene film P in face to face contiguous relationship. Thus positioned, the sheets 18 and 19 are shifted laterally or offset relative to one another, such as to provide a pair of narrow strips or seaming surfaces 20 and 21 along two opposing parallel edges thereof, thus leaving a portion of the polyethylene film P exposed along each of the offset-seaming surfaces 20 and 21. The sheets may then be heat sealed together along their opposed coextensive edges 22 and along the two remaining inset edges 23, thereby resulting in a hermetically sealed envelope defining a chamber or space 24 therein, which is capable of being inflated. The sheets 18 and 19 may then be folded centrally along the line Y—Y, such that the parallel, opposed, polyethylene seaming surfaces 20 and 21 substantially overlap one another throughout their full length. The overlapping seaming surfaces 20 and 21 may then be heat sealed together, as at 25, thereby resulting in a double-walled, flexible sleeve-like device.

In the folded and sealed condition, the therapeutic device 17 is defined by an inner wall 26 and an outer wall 27 open at both ends and of a length sufficient for receiving an extremity, such as an arm A therein. Here, the inner and outer walls 26 and 27 are secured together adjacent their upper and lower marginal edges 22 by heat seals and are secured together adjacent one longitudinal edge thereof by heat seal 25, as aforesaid. In the form illustrated, the device may be provided with a self-sealing valve 9 which may be partially disposed in the space 24 for inflating the device, as aforesaid.

By such an arrangement, the securement at the marginal ends and longitudinal edges of the inner wall 26 and outer wall 27 is accomplished by heat sealing a polyethylene surface to another corresponding polyethylene surface. Moreover, by such a laminated sheet structure, the intrinsic sealing characteristics of materials, such as polyethylene, Pliofilm, polyvinyl chloride and the like, are maximized to provide an economic and hermetically sealed device, while the intrinsic "burst strength" characteristics of materials, such as nylon, Mylar or the like, are also achieved to provide a therapeutic device which will withstand greater interior pressures, thereby substantially and effectively increasing the usability of the device.

In the aforementioned forms of the therapeutic device, it is important that the cross-sectional thickness of the material comprising the device be sufficient to incorporate the desired permeability and which can be effectively folded and seamed together to provide a device susceptible of applying a uniform pressure to an extremity. Accordingly, in the single film construction it is preferred that the cross-sectional thickness of materials, such as nylon, be about 0.002 inch with the preferred range of such thickness being between about 0.001 inch and 0.005 inch.

In the nylon-polyethylene laminated film construction, for example, it is preferred that the cross-sectional thickness of the nylon be about 0.0005 inch and that the cross-sectional thickness of the polyethylene be about 0.00175 inch. Moreover, in the laminated film construction the combined cross-sectional thickness of the superimposed nylon and polyethylene films would be about 0.00225 inch with the preferred range of such combined thickness being between about 0.002 inch and 0.005 inch. By such dimensional characteristics, there is provided a device which not only can be readily folded into a relatively small, compact package, but there is provided a device having smooth uniform seaming surfaces which can be applied in close proximity to the skin without causing blisters.

Though for purposes of disclosure, it is preferred that the "plastic" film materials comprising the therapeutic device be transparent to facilitate visual observation of the extremity, it it to be noted that other materials which are translucent or substantially opaque having the desired property characteristics may also be advantageously utilized in accordance with the principles of the instant invention.

From the foregoing description and accompanying drawings, it will be seen that the present invention provides a novel therapeutic pressure responsive device which may be economically and effectively utilized in the treatment of fractures, burns and other such extensive wounds. It will be seen that the invention not only provides a novel method of making such a therapeutic device which possesses superior characteristics of strength, stretch resistance, abrasion resistance, and permeability highly suitable for therapeutic and/or surgical purposes, but which also provides a novel method of hermetically sealing such a device so as to effectively withstand higher pressures than that heretofore achieved. Moreover, the invention not only provides a means whereby unskilled hands may be safely and expeditiously utilized to apply uniformly higher pressures during treatment, but more importantly the present invention provides a means for effectively widening the scope of therapy that may be administered to a patient under treatment.

Thus, it can be seen that the device is readily and easily susceptible for use as a sheath, splint, bandage or other such similar therapeutic device for immobilizing an extremity that has been injured. By such an arrangement, various animal and/or human extremities may be encased within the therapeutic device and subjected to a predetermined pressure with intermittent or continuous flowing current of fluid pressure, such as pressurized air, which could be either heated or cooled depending on the desired therapeutic treatment.

The terms and expressions which have been used are used as terms of description and not of limitation, and there is no intention in the use of such terms and expressions of excluding any equivalents of any of the features shown or described, or portions thereof, but it is recognized that various modifications are possible within the scope of the invention claimed.

I claim:

1. A method of making a therapeutic pressure responsive device, comprising providing at least two coextensive laminated sheets of flexible, transparent "plastic" film-like material, superimposing the sheets one on the other and selectively offsetting the sheets relative to one another to expose a pair of narrow seaming surfaces along their opposed parallel edges thereof, securing the sheets together to form a unitary structure defining an enclosed space therebetween, folding the unitary structure centrally thereof such that the exposed narrow seaming surfaces of the sheets substantially overlap one another, and sealing the overlapping seaming surfaces together to form a double-walled, inflatable sleeve-like device for receiving an extremity therein.

2. A method of making a therapeutic pressure responsive device, comprising providing at least two coextensive sheets of laminated material wherein each of said sheets comprises flexible, transparent, films of nylon and polyethylene laminated together to form a composite structure, superimposing the sheets with the polyethylene films in contiguous relationship so as to expose the polyethylene films along the opposed marginal edges of the sheets thereof, securing the sheets together to form a unitary structure defining an enclosed space therebetween, folding the unitary structure transversely thereof such that the exposed polyethylene films substantially overlap one another, and sealing the overlapping polyethylene films together to form a double-walled, sleeve-like device for receiving an extremity therein.

3. A therapeutic pressure responsive device made from at least two laminated sheets of flexible, non-elastic "plastic" film-like material secured together to provide an elongated double-walled, sleeve-like device which is open at both ends for receiving an extremity therein, said laminated sheets being superimposed one on the other and hermetically joined together adjacent four marginal edges thereof to provide an uninterrupted pressure receiving space therebetween, each of said laminated sheets being substantially coextensive in length and width and both of said laminated sheets being superimposed in off-set relationship with one another to provide a pair of relatively narrow seaming surfaces along opposing marginal edges thereof, said laminated sheets being folded over with one of said seaming surfaces being disposed in overlapping relationship with the other of said seaming surfaces, and means hermetically joining tthe overlapping seaming surfaces together adjacent one longitudinal edge thereof.

4. A therapeutic device according to claim 3, wherein the total cross-sectional thickness of each laminated sheet is between about 0.002 inch and 0.005 inch.

5. A therapeutic device according to claim 3, wherein each of said laminated sheets comprises flexible, transparent films of nylon and polyethylene, and wherein the cross-sectional thickness of the nylon film is about 0.0005 inch and the cross-sectional thickness of the polyethylene film is about 0.00175 inch.

6. A therapeutic device according to claim 3, wherein each of said laminated sheets comprises flexible, transparent films of nylon and polyethylene secured together to provide a unitary structure and wherein the narrow seaming surfaces defined thereby comprise polyethylene.

7. A therapeutic device according to claim 3, including a self-sealing means communicating with said pressure receiving space and adapted for alternately inflating and deflating said device.

8. A therapeutic pressure responsive device made from at least two thin sheets of flexible, "plastic" film-like material secured together to provide an elongated double-walled, sleeve-like device having at least one open end for receiving an extremity therein, said sheets being superimposed one on the other and joined together adjacent four opposed marginal edges thereof to provide a laminate-like structure having an uninterrupted pressure receiving space therebetween, said sheets being superimposed in off-set relationship relative to one another to provide a pair of relatively narrow seaming surfaces along opposed marginal edges thereof, said sheets being folded over with one of said off-set seaming surfaces being disposed in overlapping relationship with the other of said off-set seaming surfaces, and means hermetically joining the overlapping seaming surfaces together adjacent one longitudinal edge thereof.

9. A therapeutic device according to claim 8, including self-sealing means communicating with said space for alternately inflating and deflating said device.

10. A therapeutic pressure responsive device made from at least two sheets of thin, flexible, "plastic" film-like material secured together to provide an elongated double-walled, sleeve-like device which is open at both ends for receiving an extremity therein said sheets being superimposed one over the other and heat sealed together adjacent four opposed marginal edges to provide a hermetically sealed laminate-like structure having an uninterrupted pressure receiving space therebetween, said sheets being generally coextensive in length and width and being superimposed in off-set relationship relative to one another to provide a pair of spaced, relatively narrow seaming surfaces along opposed marginal edges of the structure, said sheets being folded over such that one of the seaming surfaces is disposed in overlapping relationship with the other of said seaming surfaces, sealing means joining the overlapped seaming surfaces together adjacent one longitudinal edge, and self-sealing valve means communicating with said spaces for alternately inflating and deflating said device.

11. A method of making a therapeutic pressure responsive device, the steps comprising, providing at least two sheets of thin, flexible, "plastic" film-like material, superimposing the sheets one on the other in relatively off-set relationship to provide a pair of spaced relatively narrow seaming surfaces along opposed marginal edges thereof, securing the sheets together adjacent four opposed marginal edges to provide a laminate-like structure having an uninterrupted pressure receiving space therebetween, folding the structure centrally so that the off-set seaming surfaces substantially overlap one another, and sealing the offset and overlapped seaming surfaces together adjacent one longitudinal edge to provide a smooth, uninterrupted double-walled, inflatable device which is open at both ends for receiving an extremity therein.

References Cited by the Examiner

UNITED STATES PATENTS

| | | | |
|---|---|---|---|
| 2,140,213 | 12/1938 | Tegarty | 156—203 |
| 2,267,070 | 12/1941 | Baldwin | 128—165 |
| 2,694,395 | 11/1954 | Brown | 128—38 |
| 2,700,165 | 1/1955 | Talisman | 251—348 X |
| 2,732,882 | 1/1956 | Kuta | 156—203 |
| 2,826,193 | 3/1958 | Vineberg | 128—38 |
| 2,834,340 | 5/1958 | Walter | 128—166 X |
| 2,943,859 | 7/1960 | Koski et al. | 128—165 X |
| 3,083,708 | 4/1963 | Gottfried | 128—165 X |
| 3,153,413 | 10/1964 | Gottfried | 128—165 |

FOREIGN PATENTS 549,294  11/1942  Great Britain.

RICHARD A. GAUDET, *Primary Examiner.*